US006809311B2

(12) United States Patent
Engdahl et al.

(10) Patent No.: US 6,809,311 B2
(45) Date of Patent: Oct. 26, 2004

(54) METHOD OF GAMMA RAY EVENT SELECTION

(75) Inventors: John C. Engdahl, Lake Forest, IL (US); Darrell D. Burckhardt, Hoffman Estates, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 369 days.

(21) Appl. No.: 09/987,644

(22) Filed: Nov. 15, 2001

(65) Prior Publication Data

US 2003/0094569 A1 May 22, 2003

(51) Int. Cl.[7] .................................................. G01T 1/20
(52) U.S. Cl. .............................. 250/252.1; 250/370.08
(58) Field of Search ............................. 250/252.1, 586, 250/330, 363.02, 363.04, 363.09, 370.08, 370.11

(56) References Cited

U.S. PATENT DOCUMENTS 5,227,968 A * 7/1993 Ichihara ................. 364/413.24
5,561,297 A   10/1996 Engdahl
5,847,396 A * 12/1998 Lingren et al. ............. 250/369

* cited by examiner

Primary Examiner—Constantine Hannaher
Assistant Examiner—Timothy Moran

(57) ABSTRACT

The present invention provides a method for discriminating between detected radiation events, so that the sensitivity of the radiation detector may be preserved without causing the inclusion of a large number of the undesired radiation events. This method includes the steps of: (1) empirically determining the energy response function of the radiation detector; and (2) then using the energy response function during the actual detection process to differentiate between the desired and undesired radiation events. Generally, the energy response function for each of the detectors is determined by simulating the condition for the subsequent, actual measurement. During this process, the detector is illuminated with a uniform stream of radiation to be measured. The detector should be exposed to a large number of radiation rays, and the number of undesired rays is minimized. For example, the detector will be exposed to only direct, unscattered radiation. This simulation produces an energy response function for the detector in conditions that approximate the actual measurement. Then, when taking actual measurements in the second step, a least squares estimate of the number of desired, unscattered events is produced by taking the dot product of (1) the spectrum acquired during actual measurement and (2) a weighting vector determined from the empirically determined energy response function.

10 Claims, 6 Drawing Sheets

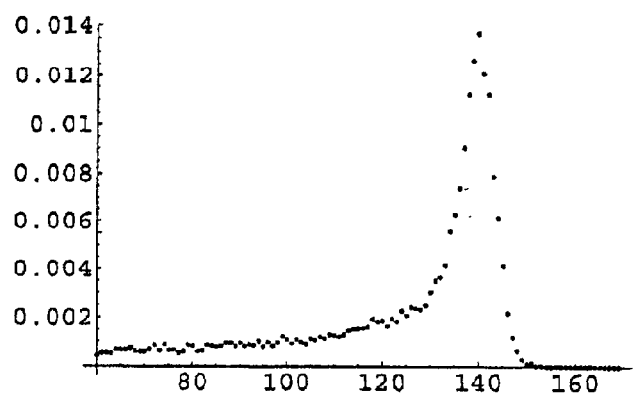
Figure 1. Typical CZT Pixel Response to 140 keV Gamma rays
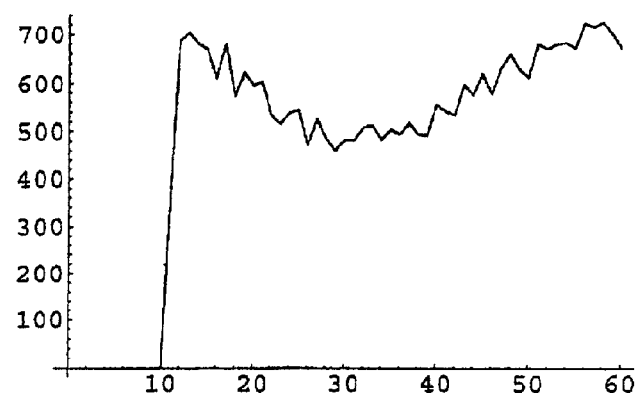
Figure 2. Spectrum of Single Compton Scattered Gammas from 140 keV Source – Energy Range 80–140 keV

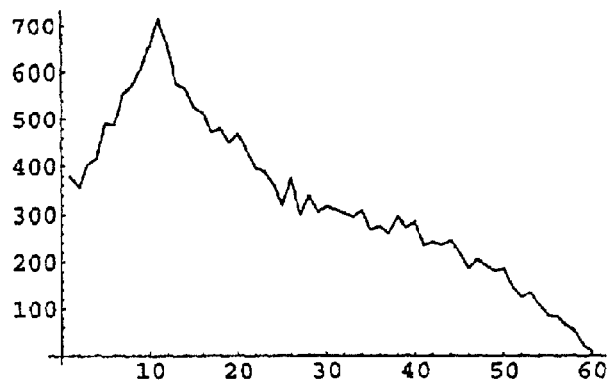
Figure 3. Spectrum of Twice Compton Scattered Gammas from 140 keV Source – Energy Range 80–140 keV
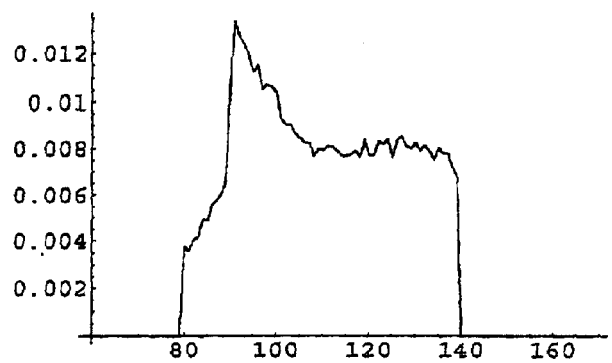
Figure 4. Sum Scatter Spectrum from 140 keV Source – Energy Range 80–140 keV, Integral Normalized to 0.78
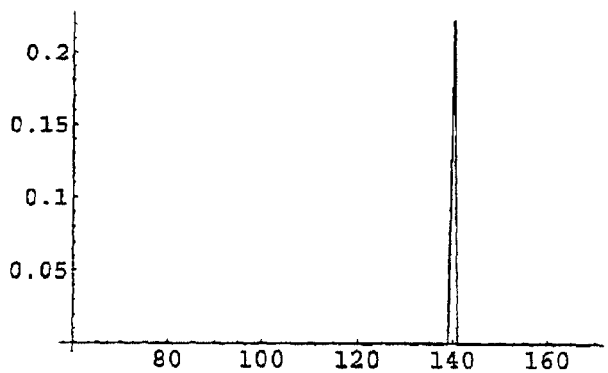
Figure 5. Monoenergetic 140 keV Source Spectrum – Integral Normalized to 0.22

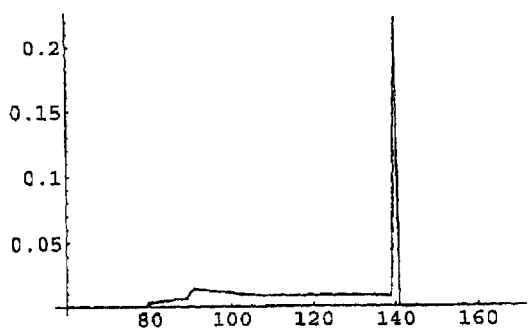
Figure 6. Total Spectrum of Gammas Emanating from a 10 cm Diameter Water Sphere- Energy Range 80-140 keV, Integral Normalized to 1.0
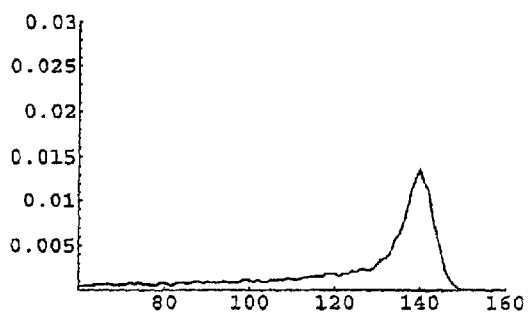
Figure 7. Unscattered Gamma Spectrum in CZT Integral Arbitrarily Normalized to 30%
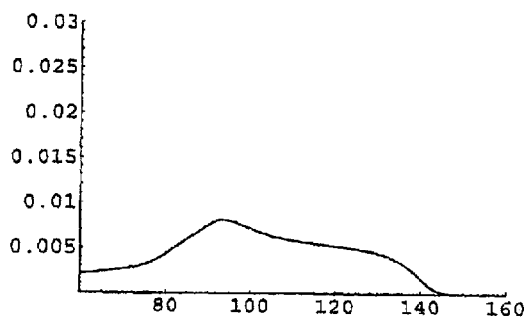
Figure 8. Scattered Gamma Spectrum in CZT Integral Arbitrarily Normalized to 70%
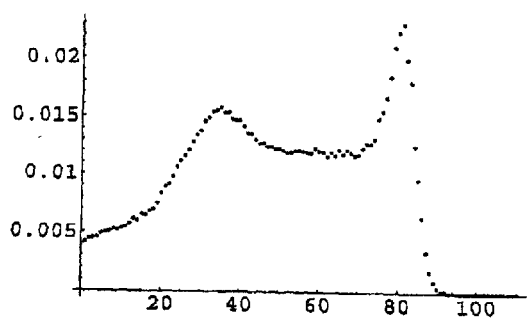
Figure 9. Composite Spectrum in CZT

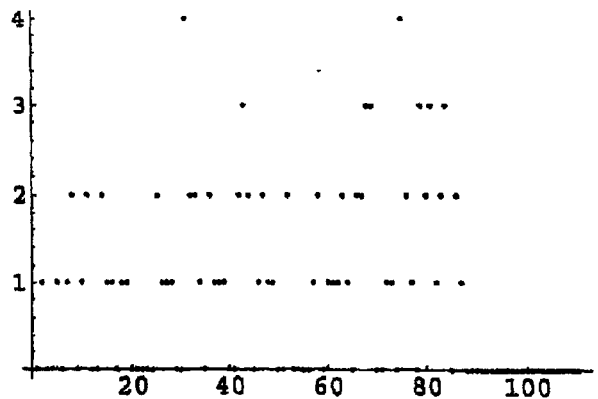
Figure 10. A Randomly Generated Spectrum of 100 Counts.
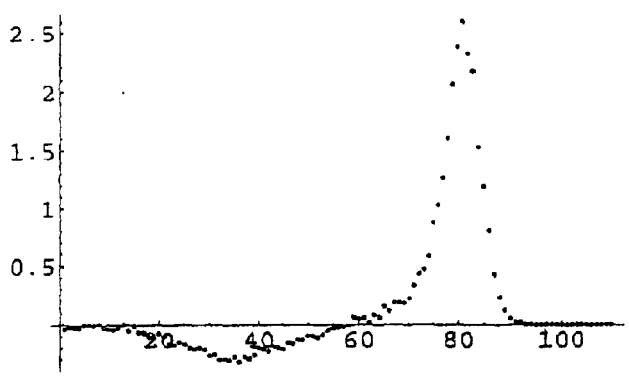
Figure 11. Plot of the Vector Corresponding to the Weights of the Unscattered Component
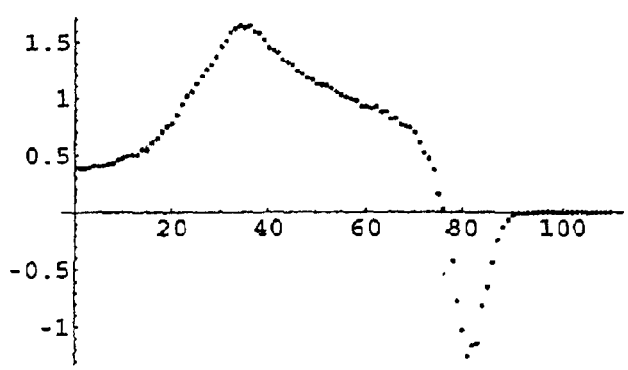
Figure 12. Plot of the Vector Corresponding to the Weights of the Scattered Component

METHOD OF GAMMA RAY EVENT SELECTION

FIELD OF THE INVENTION

The present invention relates to an improved methodology of discriminating between desired and undesired readings or events measured by radiation detectors. Specifically, the method is intended for use in radiation detectors having non-Gaussian energy response functions.

BACKGROUND OF THE INVENTION

Gamma ray cameras are relatively well known devices used to detect gamma ray emissions from radioactive decay. A known gamma ray camera described in U.S. Pat. No. 3,011,057 for RADIATION IMAGE DEVICE, hereby incorporated by reference, uses a single sodium iodide ("NaI") scintillation detector crystal to detect gamma ray emissions. The detector crystal is positioned to receive a portion of the gamma ray emissions from the radioactive decay. When a gamma ray strikes and is absorbed in the detector crystal, the energy of the gamma ray is converted into a large number of scintillation photons that emanate from the point of the gamma ray's absorption in the detector. A photomultiplier tube, optically coupled to the detector crystal, detects a fraction of these scintillation photons and produces an electronic signal that is proportional to the number of detected incident scintillation photons. The gamma ray camera typically has several photomultiplier tubes placed in different positions, with the signals from the different photomultiplier tubes being combined to provide an indication of the positions and energies of detected gamma rays.

Gamma ray cameras are frequently used in nuclear medical imaging to record pictures of a radiation field emanating from a subject's body. The gamma rays originate from a decay of a radioactive tracer that has been introduced into the subject's body. The radioactive tracer, such as $^{99m}$Tc, is a pharmaceutical compound to which a gamma ray emitting nuclide has been attached and which undergoes some physiological process of interest after introduction into the body. For example, the tracer may accumulate in areas of high blood flow, thereby pinpointing areas of physiological activity.

Only substantially collimated gamma rays reach the gamma ray camera because a collimator usually is placed between the source of radiation and the scintillator. Of these collimated gamma rays, the gamma ray camera only detects the small fraction of gamma rays that impinge a detector, such as the above-described NaI detector crystal and photomultiplier tube assembly. From these detected gamma rays, the gamma ray camera typically selects a desired sample of gamma rays based upon their measured energy according to a process described in greater detail below. The gamma ray camera then records in an image memory the number of gamma events detected at each of a number of spatial locations corresponding to regions in the patient's body from which the gamma rays emanated. The data in the image memory is then used to form an image that corresponds to the distribution of the detected gamma events, thereby providing an image of the organ, tissue or body region of interest.

The quality of the gamma ray camera's image of the distribution of the radioactive tracer is dependent on the sensitivity of the detectors in the camera. As the sensitivity of the detector to gamma rays is increased, more gamma rays are detected and incorporated into the image, because the overall detection system sensitivity, combined with the activity of radioactive tracer presence in the body, determines the number of detected gamma ray events. Creating an image from a small set of gamma ray events may result in an inaccurate image because the small sample may not accurately represent the true distribution of the radioactive tracer within the subject's body. In particular, a reduction in the number of detected events, or "counts," results in increased fractional statistical uncertainty because the emission and subsequent detection of gamma-rays are both random, stochastic processes. As a result, for any single gamma ray detector, the standard deviation in the number of counts in that detector increases, as a fraction or as a percentage, as the number of counts decreases. Therefore, the image would be more noisy in terms of image quality as a result of decreasing the total number of counts contributing to the image.

However, increasing the total number of counts by the inclusion of false events may degrade the image produced by the camera. One source of false events is the scattering of some of the gamma rays between the point of emission and exiting the patient's body. These scattered gamma rays do not provide an accurate indication of the distribution of the radioactive tracer within the patient's body because the scattering changes the gamma ray's direction and the measured energy. As a result, the inclusion of too many scattered gamma rays in the image memory causes the gamma ray camera to produce an inaccurate image with poor contrast.

Gamma ray detectors, therefore, seek to strike a balance between scattered and unscattered gamma rays without a loss of sensitivity. Typically, this result is accomplished by evaluating the energy levels of the detected gamma ray events and selecting those gamma ray events that fall within a preset "window" or range of acceptable energy levels. This technique is based on the assumption that gamma rays of abnormally low or high energy levels have been altered prior to detection or did not originate from the radioactive tracer of interest and, accordingly, do not provide reliable indications of the rays' direction of origination. The unscattered gamma ray events tend to fall within the window, whereas the scattered gamma ray events tend to fall outside the window. While a small number of scattered gamma rays would also fall within this energy window, these detected scattered gamma rays would be greatly outnumbered by the unscattered events. The gamma ray camera may vary the energy window as needed to achieve a desired result; for example, a narrower energy window may continue to accept a large number of unscattered gamma ray events while excluding more scattered events.

Frequently, the energy resolution of the gamma ray detector, such as the above-described NaI detector, can be characterized by a Gaussian distribution. The energy resolution of the gamma ray detector is then described by the full-width at half-maximum ("FWHM") of the Gaussian shaped photopeak.

As explained above, gamma ray cameras generally use energy windows to discriminate between scattered gamma rays and gamma rays that reached the detector without interaction. The use of the energy window that defines a range of acceptable energy events is fairly effective in gamma ray cameras having Gaussian energy response functions because a large percentage of the desired gamma ray events are concentrated within a small range of energy levels. For instance, with a monoenergetic gamma ray emitting isotope in the absence of any scattered gamma rays, an energy window of approximately twice the width of the FWHM centered over the photopeak would select on the order of 99% of the total unscattered events.

However, the use of an energy window has the unavoidable disadvantage of excluding some of the desired gamma ray events while including some of the undesired gamma ray events, regardless of the width of the energy window. It is therefore the goal of the present invention to present an improved methodology to differentiate between the desired and undesired gamma ray events, without decreasing the sensitivity of the detector.

U.S. Pat. No. 5,561,297 for SCATTER CORRECTING GAMMA CAMERA, incorporated by reference herein in its entirety, discloses a method that improves the quality of an image by reducing the inclusion of scattered gamma rays into an image. The method measures the response of the imaging detector to substantially unscattered gamma rays, fitting a calibration function to the detector response to the unscattered gamma rays for each spatial location. The method then fits the response of the imaging detector to a field of both scattered and unscattered gamma rays with a combination of the measured responses to the unscattered gamma rays and an estimated shape for the spectrum of scattered gamma rays. The response function is a Gaussian function and the centroid energy and standard deviation of the Gaussian function are the spatially varying parameters that are determined by fitting the unscattered gamma ray spectrum for each spatial location.

The disadvantages of using an energy window are especially evident with gamma ray detectors having non-Gaussian energy response functions. In detectors with an energy response function that is not Gaussian shaped, a significant number of the desired gamma ray events occur away from the photopeak of the energy response function. The use of a narrow energy window would exclude these desired gamma ray events, whereas the use of a wide energy window to include these off-peak values would include too many of the undesired, scattered gamma ray events.

One type of gamma ray detector that has a non-Gaussian shaped energy response function is a solid state, pixelated detector made from the room temperature semiconductor material cadmium zinc telluride ("CZT"). For example, the measured energy response function for one CZT detector has a photopeak in the range of 5% FWHM and a significant tailing toward the lower energy levels. Therefore, a large number of the desired gamma ray events detected with this CZT detector occur away from the photopeak and would be wrongly excluded with the use of a narrow energy window.

FIG. 1 illustrates a typical energy spectrum of a single pixel of a pixelated CZT detector exposed to substantially unscattered 140 keV gamma rays. In FIG. 1, the peak centered about 140 keV represents the gamma rays that have been absorbed substantially within the center portion of the single pixel, and the distribution of signal amplitudes of these events is approximately Gaussian. However, a significant number of gamma rays are also detected in the portion of the energy response spectrum that tails toward the lower energies. This phenomenon is caused, in part, by gamma ray absorption events that do not confine all charge creation to within a single pixel and by non-ideal charge collection. Because the illustrated response function represents the distribution of measured signals from only a single pixel, charge that is lost from the pixel and shared with adjacent pixels is not included in the response function. As a result, gamma ray absorption events in which the charge collection is incomplete due to charge sharing with other pixels are lost from the peak region and contribute to the low energy tailing.

The use of a simple energy window to discriminate unscattered from scattered gamma-rays for detectors with non-Gaussian response functions, such as the CZT detector, is problematic. The use of a simple energy window for the detector pixel shown in FIG. 1 would reduce the overall sensitivity of the detector if the window width were made narrow (about two times the FWHM width of the peak). A narrow window would encompass the peak but not the unscattered events that contribute to the tailing toward lower energies, so a large number of the desired gamma ray events would be excluded, reducing the sensitivity of the detector. Conversely, using a very wide energy window to include the peak region and the tailing toward lower energies would also include a high fraction of scattered gamma rays in the image, and thus would degrade the image quality.

It is therefore a further goal of the present invention to provide a reliable methodology for estimating unscattered gamma rays detected by a gamma ray detector having a non-Gaussian energy response function.

SUMMARY OF THE INVENTION

These and other needs are addressed in the present invention through a novel method for discriminating between scattered and unscattered detected radiation events, so that the sensitivity of the radiation detector may be preserved without causing the inclusion of a large number of undesired radiation events. This method includes the steps of: (1) empirically determining the energy response function of the radiation detector; and (2) then using the empirically determined energy response function during the actual detection process to differentiate between desired and undesired radiation events.

In a preferred embodiment, the energy response function for each of the detectors is determined by simulating the condition for the subsequent, actual measurement. During this process, the detector is illuminated with a uniform field of radiation to be measured. The detector should be exposed to a large number of radiation photons, and the number of undesired rays is minimized. For example, the detector will be exposed to only direct, unscattered radiation. This simulation produces an energy response function for the detector under conditions that approximate the actual measurement.

During the actual measurement, the detector produces a second energy response spectrum that represents both the desired and undesired events. Then, a least squares estimate of the number of desired, unscattered events is produced by taking the dot product of (1) the spectrum acquired during actual measurement and (2) a weighting vector determined during the calibration step.

BRIEF DESCRIPTION OF THE DRAWINGS

These and other features and advantages of the present invention are more fully described in the following attached drawings in which corresponding elements are designated by like reference numbers:

FIG. 1 (Prior Art) illustrates an energy spectrum of one type of detector having a non-Gaussian energy response function;

FIGS. 2–12 illustrate energy spectrums from a hypothetical example illustrating the method of FIGS. 13A–C.

DETAILED DESCRIPTION OF THE PREFERRED EMBODIMENT

Figure 13A:
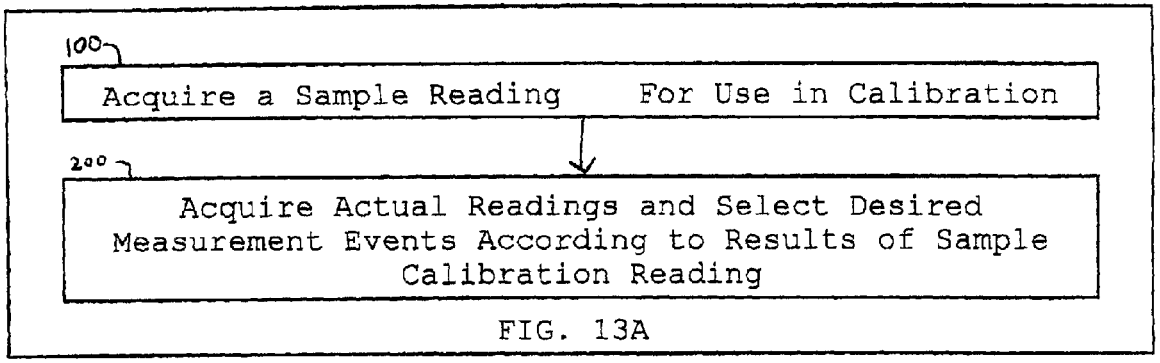
FIGS. 13A–C are flow charts of the method for discriminating between detected radiation events in accordance with an embodiment of the present invention.

As illustrated in FIG. 13A, the present invention is a method of replacing the simple energy window as a means for discriminating between scattered and unscattered gamma rays in a gamma ray camera. The method has two steps: 1) a calibration step 100 to obtain the energy response function of the detector; and 2) an acquisition and correction step 200 when radiation is actually detected and then selected for use according to information determined during the calibration step 100. Details of the calibration step 100 are shown in FIG. 13B, and details of the acquisition step are shown in FIG. 13C.

Figure 13B:
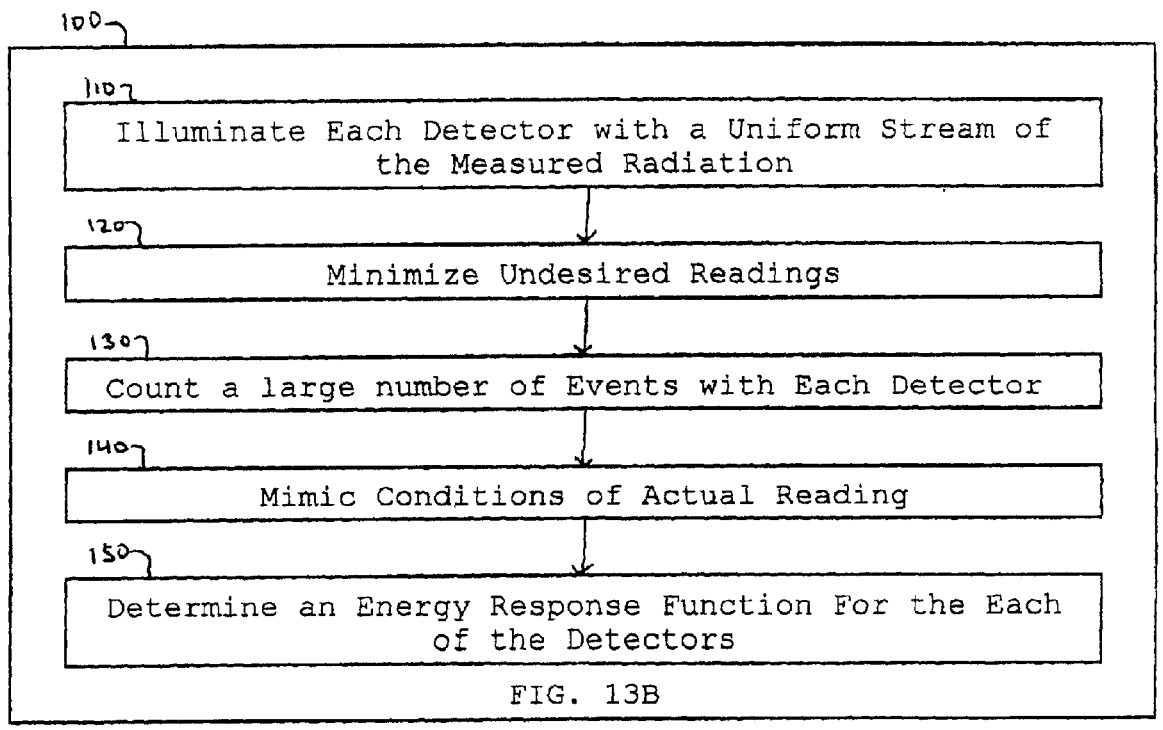
Figure 13C:
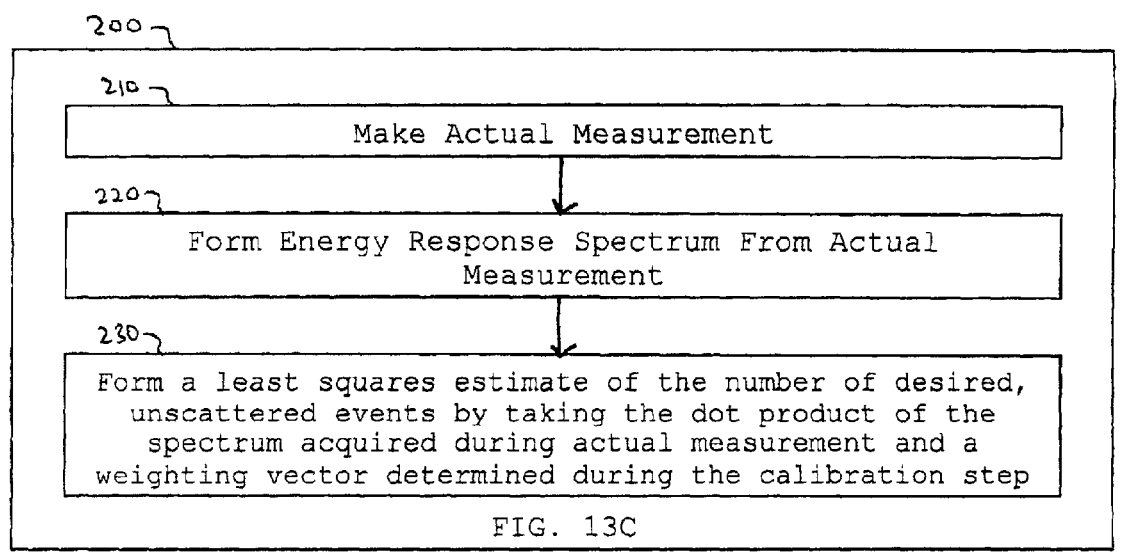

The response function of each individual pixel in an imaging detector is measured, giving a result similar to the energy response function in FIG. 1, at step 150 of FIG. 13B. Measurement of the response function is accomplished by illuminating the detector with a uniform stream of radiation of the energy or energies of interest, step 110. The uniform flood ideally comprises only unscattered gamma rays, so the number of scattered radiation events should be minimized, step 120. During the calibration step, 110, the total number of counts acquired by each detector should be large, so that the shape of the response function is accurately measured and not dominated by random counting statistics, step 130.

It is also important that the conditions of the illumination during the calibration be substantially identical to conditions encountered during actual measurement, step 140, such as the conditions encountered during the clinical imaging of a patient's body when a large fraction of scattered gamma rays will be present. For example, the response function is generally significantly different for a pixelated detector illuminated uniformly over its entire surface as compared to illumination confined to the central region of each pixel detector. Therefore, during the measurement of the response function in the calibration step 100, the radiation collimation must match the collimation to be received by the detector during the actual measurement in step 200, so that the response functions will remain constant.

Alternatively, the detector may use previously measured radiation samples and use these results in calibration step 100 to estimate the energy response function for the detector.

Where the detector is pixelated, such as the above described cadmium zinc telluride ("CZT") detector, a separate energy response function is determined for each pixel during the calibration step 100.

During the acquisition step 200 of the method, as shown in FIG. 13C, the detector makes actual measurements, step 210, and forms energy spectra for these measurements, step 220. The radiation measurements include both desired and undesired events. During acquisition, detected events are stored in a memory of the gamma ray camera. The acquisition can either acquire a large list mode file, where all events are stored sequentially with the address of a detector or event location and the energy or amplitude of that event, or individual energy spectra can be accumulated for each pixel detector separately.

The spectrum corresponding to the response of the detector to unscattered gammas of energy, E, is defined as the vector, $R_E$. The vector length is the number of energy bins in the spectrum. Similarly, the spectrum corresponding to the response of the detector pixel to scattered gammas from a source of energy, E, is defined as the vector, $S_E$. Using this convention, the number of events or counts detected in each energy bin within a single detector is represented as a vector $C_E$. The spectrum recorded during an acquisition is then given by Equation 1:

$$\vec{C}_E = c_{us} \vec{R}_E + c_s \vec{S}_E \quad (1)$$

In Equation 1, $c_{us}$ is the number of unscattered counts and $c_s$ is the number of scattered counts acquired, and accordingly, $c_{us}$ and $c_s$ are scalar quantities.

Equation 1 may be rewritten as Equation 2, $$\vec{C}_E = F \begin{pmatrix} c_{us} \\ c_s \end{pmatrix} \quad (2)$$

where F is given by Equation 3, $$F = \begin{pmatrix} R_1 & S_1 \\ R_2 & S_2 \\ \vdots & \vdots \\ R_n & S_n \end{pmatrix} \quad (3)$$

Solving for scalar coefficients yields Equation 4, $$\begin{pmatrix} c_{us} \\ c_s \end{pmatrix} = (F^T F)^{-1} F^T \vec{C}_E \quad (4)$$

In this solution, the matrix $(F^T F)^{-1} F^T$ consists of two rows. The first row is a column vector $V_1$ that represents the weighting factors that correspond to the unscattered component in a spectrum. Therefore, the dot product of the first row vector $V_1$ with a column vector spectrum $C_E$ equals the least squares estimate of the magnitude of unscattered component in the spectrum, which is $c_{us}$. The dot product of the acquired spectrum $C_E$ in step 120 with a weighting vector $V_1$ determined during the calibration gives a least squares estimate of the number of unscattered gammas in the acquired spectrum, step 230. This number $c_{us}$ is exactly what is desired for determining how many of the measured events to include into the image.

EXAMPLE 1

For the purpose of development and demonstration of the method of this invention, a Monte Carlo simulation was used to generate spectra of scattered gamma rays emanating from a sphere of water.

FIGS. 2–6 show the components and composite spectrum emanating from a 10 cm diameter water sphere with a 140 keV source of gammas at the center. Estimates of the measured spectra for unscattered and scattered for the CZT detector pixel were derived by convolving the Monte Carlo results with the detector response function measured at 140 keV. Specifically, FIG. 2 illustrates the energy response spectrum of single Compton scattered gamma rays; FIG. 3 illustrates the energy response spectrum of twice Compton scattered gamma rays; FIG. 4 illustrates the sum spectrum from FIGS. 2–3 for the scattered gamma rays, normalized to 0.78; FIG. 5 illustrates a monoenergetic source spectrum normalized to 0.22; and FIG. 6 illustrates a simulated total spectrum from FIGS. 2–5.

FIGS. 7–9 respectively show the unscattered, scattered, and composite spectra expected for the CZT detector, assuming an arbitrary mixture of 70% scatter and 30% unscattered gamma rays incident on the detector. Testing methods of determining the number of unscattered gamma detections were done by combining arbitrary fractions of scattered and unscattered gammas, and then randomly generating a detected spectrum for a fixed number of total counts. Specifically, FIG. 7 illustrates an unscattered spectrum in a CZT detector normalized to 30%; FIG. 8 illustrates a scattered spectrum in a detector normalized to 70%; and FIG. 9 illustrates the composite spectrum for the CZT detector from FIGS. 7–8. FIG. 10 then shows an example spectrum containing 100 counts, randomly selected from the composite spectrum of FIG. 9.

Three test spectra were then constructed by adding together different proportions of scattered and unscattered response. The three choices were: 1) 50% scatter/50% unscattered, 2) 70% scatter/30% unscattered, and 3) 90% scatter/10% unscattered. For each of these cases, four trials were done where the total numbers of counts in a trial were fixed at 500, 100, 50, and 10 counts. For each of these trials, 100 random distributions were generated using a Poisson random number generator. Each of these random spectra was similar to FIG. 10.

A comparison was made between the method of this application and the conventional method of using a simple energy window to determine the number of unscattered events to include in the image. For each trial, each of the 100 random spectra was used to compute the counts that a pixel would record in the image. A fixed window of 10% width (14 keV total, centered at 140 keV) was simulated by simply summing all of the random counts that fell within the window. A 10% window was chosen because the peak in the response function is approximately Gaussian with a 5% FWHM. The method of energy discrimination of this application was simulated by simply computing the dot product of the unscattered component vector with the random counts spectra. The mean number of counts and the standard deviation of each trial were computed, for both the window and the method of this invention using the 100 random samples for each method. The results are summarized in Table 1.

TABLE 1

COMPARISON OF FIT METHOD TO SIMPLE ENERGY WINDOW

| Scatter % | Unscatter % | Total Counts | Unscatter Counts True Means | Fit Mean Counts | Fit Std. Dev Counts | Window Mean Counts | Window Std. Dev. Counts |
|---|---|---|---|---|---|---|---|
| 50 | 50 | 500 | 250 | 248.9 | 23.9 | 162.4 | 11.8 |
|  |  | 100 | 50 | 49.3 | 10.8 | 32.4 | 5.8 |
|  |  | 50 | 25 | 23.4 | 7.6 | 15.5 | 4.3 |
|  |  | 10 | 5 | 4.86 | 3.3 | 3.0 | 1.7 |
| 70 | 30 | 500 | 150 | 150.0 | 18.5 | 113.3 | 10.7 |
|  |  | 100 | 30 | 29.9 | 8.2 | 22.6 | 5.0 |
|  |  | 50 | 15 | 15.1 | 6.2 | 11.3 | 3.5 |
|  |  | 10 | 3 | 3.2 | 2.6 | 2.4 | 1.5 |
| 90 | 10 | 500 | 50 | 49.5 | 10.6 | 62.4 | 6.8 |
|  |  | 100 | 10 | 10.2 | 5.8 | 12.6 | 3.2 |
|  |  | 50 | 5 | 5.5 | 4.9 | 6.6 | 2.8 |
|  |  | 10 | 1 | 0.77 | 1.8 | 1.27 | 1.1 |

The results summarized in Table 1 clearly show that the method of this invention is far superior to an energy window for predicting the mean number of unscattered detection events for a detector of the response function of the subject CZT detector. Although the estimates using the window method have a smaller variance about their predicted mean, their predicted mean is significantly in error in all cases.

FIG. 11 illustrates the vector corresponding to the weights of the unscattered component from the measurement; and FIG. 12 illustrates the vector corresponding to the weights of the scattered component from the measurement. The fit or weighting vectors illustrated in FIGS. 11 and 12 were derived using the 70% scattered/30% unscattered spectrum.

It is important to note that the predictive accuracy of the unscattered counts is almost as good for the 50% scattered/50% unscattered and 90% scattered/10% unscattered cases, as for the 70% scattered/30% unscattered. This fact suggests that the method is tolerant over a large range of variability in the scatter to unscattered components.

The invention having been described, it will be apparent to those skilled in the art that the same may be varied in many ways without departing from the spirit and scope of the invention. Any and all such modifications are intended to be included within the scope of the following claims.

What is claimed:

1. A method for discriminating between desired and undesired radiation events detected by a radiation detector in an imaging operation, comprising the steps of:
   (a) obtaining a response function of said detector for a uniform field of radiation under conditions simulating an actual imaging operation;
   (b) obtaining a radiation distribution of substantially an entire energy spectrum of radiation emanating from an object undergoing imaging in an actual imaging operation; and
   (c) obtaining said desired radiation events by mathematically operating on said radiation distribution with said response function.

2. The method of claim 1 wherein the detector is used in a medical imaging device.

3. The method of claim 1 wherein the detector is a pixelated, cadmium zinc telluride (CZT) device.

4. The method of claim 3 wherein the step of obtaining a response function comprises obtaining a response function for each pixel of the CZT detector.

5. The method of claim 1 wherein the step of obtaining desired radiation events includes the steps of forming a least squares estimate of the number of desired events by taking a dot product of the energy response function for the actual imaging operation and a weighting vector determined during the step of obtaining a response function for a uniform radiation.

6. A method for discriminating between desired and undesired radiation events detected by a radiation detector in an imaging operation, comprising the steps of:
   (a) obtaining a response function of said detector for a uniform field of radiation under conditions simulating an actual imaging operation;
   (b) obtaining a radiation distribution of substantially an entire energy spectrum of radiation emanating from an object undergoing Imaging in an actual imaging operation; and
   (c) obtaining said desired radiation events by mathematically operating on said radiation distribution with said response function to form a least squares estimate of the number of desired events by taking a dot product of the energy response function for the actual imaging operation and a weighting vector determined during the step of obtaining a response function for a uniform radiation.

7. The method of claim 6 wherein the detector is used in a medical imaging device.

8. The method of claim 6 wherein the detector is a pixelated, cadmium zinc telluride (CZT) device.

9. The method of claim 6 wherein the step of obtaining a response function comprises obtaining a response function for each pixel of the CZT detector.

10. A method for obtaining unscattered radiation events from a radiation distribution of radiation emanating from an object as detected by a radiation detector, comprising the steps of:

obtaining a response function of said radiation detector to a uniform field of radiation without using any energy window discrimination of radiation events;

obtaining an energy spectrum of scattered and unscattered events created by radiation from said object without using any energy window discrimination of radiation events; and mathematically operating on said energy spectrum with said response function to thereby obtain a distribution of unscattered events created by radiation from said object.

* * * * *